April 24, 1962    E. WEINBRENNER ETAL    3,031,271
MIXING APPARATUS
Filed May 9, 1957
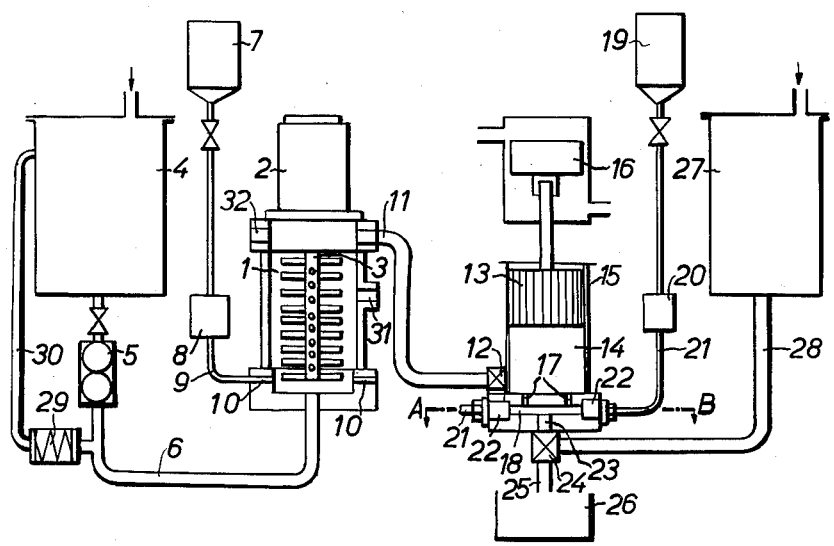
FIG.1
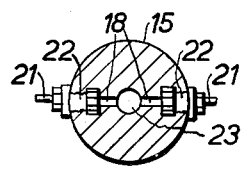
FIG. 2   SECTION A-B
INVENTORS:
ERWIN WEINBRENNER, PETER HOPPE, KARL BREER.
BY
*Clelle W. Upchurch*
ATTORNEY United States Patent Office 3,031,271
Patented Apr. 24, 1962

3,031,271
MIXING APPARATUS
Erwin Weinbrenner, Leverkusen, Peter Hoppe, Troisdorf, and Karl Breer, Koln-Flittard, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
Filed May 9, 1957, Ser. No. 658,182
Claims priority, application Germany May 12, 1956
3 Claims. (Cl. 23—252)

This invention relates generally to the manufacture of polyurethane plastics and, more particularly, to an improved process and apparatus for mixing the components of a polyurethane plastic.

Polyurethane plastics are prepared by chemical reaction between an organic compound having reactive hydrogen atoms, a diisocyanate and a chain-extender or cross-linking agent. Probably the best heretofore available process for mixing the components of a polyurethane plastic reaction liquid is disclosed in the Hoppe et al. Patent 2,764,565. The organic compound having the reactive hydrogen atoms is a very viscous liquid which must be intimately mixed with the polyisocyanate and also with a suitable catalyst which is much less viscous and is used in a relatively small volume in comparison with the volume of organic compound having reactive hydrogen atoms. The polyisocyanate and the organic compound having the reactive hydrogen atoms may be mixed together and stored in admixture or they may be heated or otherwise treated to bring about chemical reaction therebetween to form a prepolymer which may be reacted later with the chain-extender or cross-linker while associated with a catalyst to form the solidified polyurethane plastic. Once the catalyst is mixed with the organic compound having the reactive hydrogen atoms, the polyisocyanate and the cross-linker or chain-extender, however, chemical reaction proceeds very rapidly with the production of a solidified product. The preparation of the liquid reaction mass, therefore, requires complete dispersion of the relatively small volume of catalyst and cross-linker throughout the viscous organic compound having reactive hydrogen atoms or the prepolymer formed therefrom and also requires that this mixing and discharge of the resulting mixture be achieved in a relatively short time. In accordance with the process of the Hoppe et al. patent, the catalyst which may be mixed with water or other chain-extender is injected into a flowing stream of the organic compound having the reactive hydrogen atoms or into a stream of the prepolymer. It was found that injection of the catalyst or activator mixture into the more viscous liquid resulted in intimate mixing. However, it has been found that where it is desired to operate an apparatus intermittently some difficulty is experienced because the mixture remaining in the mixing nozzle between pouring operations will react chemically to form a solidified product which plugs the discharge orifice.

It is therefore an object of this invention to provide a process and apparatus for mixing the components of a polyurethane plastic together and for preparing solidified polyurethane plastics which are devoid of the foregoing disadvantages. Another object of the invention is to provide an improved process for mixing a relatively viscous liquid with a relatively small volume of a much less viscous liquid. Still another object of the invention is to provide an improved process and apparatus for mixing the components of a polyurethane plastic together and for discharging the entire volume of mixture without any solidification of polyurethane plastic in the mixing apparatus. A still further object of the invention is to provide an improved process and apparatus for preparing polyurethane plastics from organic compounds having reactive hydrogen atoms, polyisocyanates and a suitable catalyst or activator mixture which may contain a cross-linking or chain-extending agent which is adapted for the preparation of the polyurethane plastics in intermittent operation.

Other objects will become apparent from the following description with reference to the accompanying drawing, in which:

FIGURE 1 is a diagrammatic plan view of an assembly of apparatus making up one embodiment of the invention, and FIGURE 2 is a cross-sectional view taken along the line a—b of FIGURE 1 of an embodiment of a suitable injection nozzle.

The foregoing objects are achieved in accordance with this invention, generally speaking, by providing a method and apparatus wherein the complete mixture of components required to chemically react to produce the solidified polyurethane plastic is not produced until a premix of components is being forcibly discharged from the mixing apparatus. More specifically, the invention contemplates a method and apparatus having a mixing chamber where some of the components of a polyurethane plastic may be mixed together and a second mixing zone provided with a positive ejection means where other components are added which are required to bring about complete chemical reaction to form the solidified product.

In accordance with a preferred embodiment of the invention in which either homogeneous or porous polyurethane plastics are prepared, the organic compound having the reactive hydrogen atoms and the polyisocyanate are mixed in one chamber and this mixture is then transferred to a second chamber having a reciprocating piston. This piston fits snugly in the chamber and, when actuated, forces the reaction mixture out through relatively small conduits which communicate with at least one injection nozzle. The catalyst and cross-linking agent are injected through the nozzle(s) into the flowing stream emerging from the second mixing zone. Immediately after injection of the catalyst into the flowing stream of organic compound having reactive hydrogen atoms and polyisocyanate or the reaction product of such a mixture, the reaction mixture may be discharged. Usually the mixture is discharged into a suitable shaping apparatus or mold. It has been found that the liquid ejected from the second mixing chamber by means of the reciprocating piston can be rapidly and intermittently mixed with the catalyst and cross-linking agent provided the ejection from the mixing chamber is through conduits of such dimension that some turbulence is obtained and provided that the injection of the catalyst is at a pressure substantially above the pressure in the conduit leading from the second mixing chamber. The resulting mixture may be discharged substantially immediately because the relatively small amount of catalyst required is substantially immediately dispersed uniformly throughout the stream of liquid emerging from the second mixing chamber.

If it is desired to produce semi-rigid or rigid homogeneous or porous polyurethane products, it may be desirable to mix the organic compound having the reactive hydrogen atoms with the activator mixture in the first mixing chamber and to thereafter inject the polyisocyanate into a stream of this mixture emerging from the second mixing chamber. In following this procedure, the polyisocyanate is substantially uniformly dispersed throughout the liquid emerging from the second mixing chamber substantially immediately and the resulting mixture may be immediately discharged into suitable shaping apparatus where solidification will result from chemical reaction.

In a preferred embodiment of the apparatus, an organic compound having reactive hydrogen atoms, such as a polyester, is drawn into the second mixing chamber as the reciprocating piston returns to its normal position after ejecting a volume of liquid from the mixing chamber. This organic compound having the reactive hydrogen atoms acts as a scavenging or flushing agent dissolving any reaction mixture remaining on the walls or otherwise within the second mixing chamber. It is then ejected from the mixing chamber before a second volume of liquid is drawn from the first mixing chamber. Of course, any other suitable scavenging liquid may be substituted for the polyester or other organic compound having reactive hydrogen atoms.

The first mixing chamber is provided with a suitable stirring mechanism and with suitable means for moving the liquid components into the mixing chamber, such as, for example, pumps. In order to achieve intimate mixing of the components in the first mixing chamber rapidly, at least one of the components is preferably injected into a body of the other component within the chamber. The injection nozzle is preferably situated near the bottom of the mixing chamber and the injection may be achieved through a plurality of injection nozzles spaced at intervals along the bottom of the mixing chamber. Usually the less viscous component, such as the polyisocyanate, catalyst, cross-linking agent or an activator mixture is injected into the more viscous liquid which may be any suitable organic compound having reactive hydrogen atoms, such as, for example, a polyhydroxy compound including a polyester, a polyalkylene ether glycol, a polyalkylene thioether glycol, an isocyanate-modified polyhydroxy compound, a polyester amide, or the like. Conduit means are provided for transferring the mixture from the first mixing chamber to the second mixing chamber, it being preferred that the conduit extend from the top of the first mixing chamber to the bottom of the second mixing chamber. The second mixing chamber communicates with a suitable storage tank containing the scavenging liquid through a suitable conduit which enters the discharge conduit below the second mixing chamber. The scavenging liquid is therefore forced through the discharge conduit into the injection zone and then into the chamber having the reciprocating piston.

The apparatus provided by this invention may be utilized in preparing polyurethane plastics from various proportions of organic compound having reactive hydrogen atoms, polyisocyanates and catalysts or other components ordinarily used in the preparation of the plastics. The invention is not concerned with any particular formulation for making polyurethane plastics but, on the other hand, provides an improved method and apparatus for preparing the reaction liquid by mixing the less viscous compounds uniformly with the more viscous polyester or the like. It should therefore not be necessary to go into any detail regarding the chemical composition of the reaction liquid or of the components used in making the liquid. However, it is pointed out that the various formulations and components of a polyurethane plastic disclosed in the aforesaid Hoppe et al. patent may be used in practicing this invention. The product may be a rubber-like polyurethane of the type disclosed in U.S. Patents 2,620,516, 2,621,166 and 2,729,618, or it may be a cellular polyurethane of the type disclosed in the Hoppe et al. patent. Any suitable polyisocyanate including those disclosed in the aforesaid patents, such as, for example, toluylene-2,4-diisocyanate, toluylene-2,6-diisocyanate, 1,5-naphthylene diisocyanate, or the like, may be used. The cross-linking agent may be water, a glycol, a polyhydric alcohol having more than two hydroxyl groups, a diamine, or any other suitable compound including those disclosed in the aforesaid patents. The apparatus is suitable for use in conjunction with any suitable catalyst or activator mixture used in formulating polyurethane plastic reaction liquids, including the tertiary amines and other catalysts disclosed in the aforesaid patents and in various other publications relating to the preparation of polyurethane plastics. Frequently, the catalyst will be mixed with water, emulsifying agents, and the like, the mixture being described as an "activator mixture."

Referring now to the drawing for a more detailed description of the invention, a plan view which diagrammatically illustrates a suitable assembly of component parts forming one embodiment of the invention is shown. Mixing chamber 1 is provided with a stirrer 3 driven by motor 2. Polyester or other suitable organic compound having at least two reactive hydrogen atoms is drawn from vessel 4 by means of pump 5 through conduit 6 and into the bottom of mixing chamber 1. Polyisocyanate is drawn from vessel 7 by means of injection pump 8 and injected through conduit 9 and injection nozzles 10 in the form of a fine stream under a pressure substantially higher than that in chamber 1 into the stream of organic compound having reactive hydrogen atoms. An excess of polyisocyanate, preferably a diisocyanate, over that required to react with all of the reactive hydrogen atoms of the polyester or the like is used. As indicated in the drawing, more than one injection nozzle 10 may be utilized for injecting the component into the flowing stream to insure optimum mixing. The components are further mixed by stirring while in chamber 1 and the resulting mixture is discharged from the top of chamber 1 through conduit 11 and valve 12 into chamber 14. Vessel 15 is provided with a reciprocating piston 13 which ejects the liquid from space 14 through conduits 17 which, in turn, merge with conduit 18 where a cross-linking agent and/or a suitable activator catalyst or accelerator is injected into the stream emerging through conduit 17. Piston 13 is actuated by means of motor 16 and preferably forces the liquid through orifices into conduits 17 under sufficient pressure to bring about turbulence in conduits 17 and 18. The injection through injector nozzles 21 and 22 is achieved by transferring the cross-linking and catalyst mixture or activator mixture from vessel 19 by means of injector pump 20 through conduit 21.

The resulting mixture is expelled into shaping apparatus 26 through bore 23, valve 24 and discharge conduit 25 immediately after the components have been injected through injector nozzles 21 and 22 into the stream flowing from chamber 14.

After all of the reaction liquid has been ejected from chamber 14, valve 24 is turned in such a way that liquid can be drawn from vessel 27 into chamber 14 as the piston returns to the position shown in the drawing. Valve 12, of course, has been closed prior to ejection of the reaction mixture from chamber 14. The polyester or the like used as the scavenging liquid is forced out of chamber 14 and back to vessel 27 by moving piston 13 downwardly. Valve 24 is closed and piston 13 is then moved to the position shown in the drawing.

While the piston is expelling the liquid from chamber 14 and while the scavenging liquid is being introduced into chamber 14 and later expelled therefrom, the stirrer 3 of chamber 1 and injection pumps 8 are not operated. Pump 5, however, continues to operate and pressure responsive valve 29 opens, permitting the polyester to be pumped through conduit 30 back into vessel 4, thus providing a means for circulating the polyester or other organic compound having reactive hydrogen atoms during the operation of the second mixing chamber. The cycle for preparing a reaction mixture may then be repeated by opening valve 12 and setting pumps 8 and stirrer 3 into operation. As soon as chamber 14 is again filled with polyester-polyisocyanate mixture or the like from chamber 1, valve 12 is again closed and the ejection step with the injection of the additional components and later the scavenging step are repeated.

Preferably, in preparing the homogeneous or porous polyurethane plastics which are of semi-rigid or rigid consistency, the accelerator and/or cross-linking agent and any other desired additive, such as, for example, a suitable fire-proofing agent, are placed in vessel 7 instead of the polyisocyanate and that liquid is injected through nozzle 10 into the stream of organic compound having reactive hydrogen atoms in chamber 1. The required amount of polyisocyanate is then injected from vessel 19 into the mixture obtained in chamber 1 as that mixture is expelled from chamber 14. The rigid or semi-rigid polyurethane plastics are prepared in this manner instead of by the procedure described above because the mixture of polyisocyanate and organic compound having reactive hydrogen atoms prepared in chamber 1 when a rigid or semi-rigid product is desired is often too viscous to be satisfactorily pumped or otherwise moved from chamber 1 to chamber 14. Organic compounds having reactive hydrogen atoms having branched chains, for example, polyesters or polyethers which have side chains because they were prepared from trifunctional compounds, such as trimethylol propane, glycerol and the like, as well as difunctional compounds, such as glycols, or the like, are used in making the rigid foam and the isocyanate-modified compound obtained when these compounds are reacted with a polyisocyanate is much more viscous than a similar product obtained from a strictly linear polyhydroxy compound of the type used in making elastic polyurethanes. By mixing these compounds having the branched chains with the cross-linking agent and/or catalyst or activator mixture in mixing chamber 1, some reduction in viscosity is obtained and it is possible to inject later the polyisocyanate into this mixture and produce a substantially uniform reaction liquid which will chemically react almost immediately. Thus, it is believed apparent that the apparatus is versatile and may be used in various ways to produce plastics of desired physical characteristics.

The pressure used for injecting the components into the chambers will vary with the pressure on the liquid into which the other components are injected. A pressure substantially higher than the pressure in the chamber gives best results. If the backpressure in the chamber is in the neighborhood of 50 lbs. per square inch, injection pressures of about 100 may be used, but it is preferred to use injection pressures of at least 300 p.s.i. and it is even more preferred to use pressures of from about 1,200 p.s.i. to about 5,250 p.s.i. or higher. The injection may be either intermittent or continuous.

It is also possible for the accelerator and/or the cross-linking agent to be introduced stepwise into the polyisocyanate mixture moving upwardly in the chamber 1, in that separate amounts of the accelerator and/or cross-linking agent are introduced through the supply opening 31 or the opening 32 situated thereabove into the chamber 1. This step serves for the production of elastic plastics.

It is also possible to introduce cross-linking agent and/or accelerator stepwise into the stream of polyester or the like at the bottom end of the chamber 1 at the position 10, and the necessary amount of polyisocyanate can then be introduced into the middle of the chamber 1, for example, at 31.

There is thus provision for considerable variation as regards the methods of introduction.

*Example 1*

Production of a molded element consisting of elastic polyurethane foam material: Component A=polyester; component B=toluylene diisocyanate; component C= activator mixture are processed in the apparatus according to the invention, which has a piston volume of, for example, 2 liters, so as to produce a molded element with a weight per unit volume of 45 kg./m.$^3$.

Component A consists of 100 parts by weight of polyester produced from 15 mols of adipic acid, 16 mols of diethylene glycol and 1 mol of trimethylol propane.

Component B consists of 36 parts by weight of toluylene diisocyanate.

Component C consists of 8 parts by weight of activator mixture consisting of 3 mols of bis-(diethylaminoethanol)-adipate, 1 mol of acid diethyl amine salt of oleic acid, 1.5 mols of sodium salt of a sulfonated castor oil containing 54% water, 1.5 mols of diethyl amine oleate and 1 mol of water.

Component A and component B are first of all combined in the mixing chamber in the ratio of 100:36, the temperature of the mixing chamber being about 30° C. The polyester-isocyanate mixture AB is then forced into the piston space 14. The mixing and conveying operation for filling the piston space of 2 liters lasts about 9 seconds when the polyester delivery pump has a capacity of 10 liters/min. With the ejection of the polyester-isocyanate mixture AB in the piston space 14 the amount of component C necessary for the final reaction is injected in the zone 18. The thoroughly homogenized reaction mixture is discharged into the mold, which has an effective volume of about 50 liters, to produce a molded body with a weight per unit volume of 45 kg./m.$^3$, from a reaction mixture, which, when expelled from the piston, has a density of 1.1 g./cc.

*Example 2*

Adherent polyurethane foamed elements:

Component A consists of 100 parts of polyester produced from 5 mols of adipic acid, 1 mol of phthalic anhydride and 8 mols of hexanetriol.

Component B consists of 75 parts by weight of toluylene diisocyanate.

Component C consists of 20 parts by weight of trichloroethyl phosphate, 1 part by weight of hexahydrodimethyl aniline and 1 part by weight of water.

1st working step: combining A and C in the mixing chamber 1 and filling the cylinder space 14 with AC.

2nd working step: ejection of AC through zone 18 in which the component B is injected.

The product has a bulk weight of about 75 kg./m.$^3$.

Although the invention has been described in considerable detail for the purpose of illustration, it is to be understood that the invention is not limited to such detail and that those skilled in the art may make variations therein without departing from the spirit and scope of the invention except as set forth in the claims.

What is claimed is:

1. An apparatus for mixing the components of a polyurethane plastic which comprises a first mixing chamber, said chamber having a plurality of inlets for the introduction of the components to said first mixing chamber, at least one of said inlets being an injection nozzle and an outlet means, a second chamber spaced from said first mixing chamber and comprising a cylinder, a reciprocating piston disposed within said cylinder, an inlet means including at least one inlet to said cylinder, said inlet means connected by a conduit to the outlet means of said first mixing chamber, said inlet means opening into said cylinder below said piston when said piston is in the unactuated position, and an outlet means through which the material within said cylinder is discharged upon actuation of said piston, said outlet means including at least one conduit, an injection nozzle disposed for injecting a final component into said outlet means of said second chamber, said injection nozzle being connected to a reservoir for said final component.

2. An apparatus for moxing the components of a polyurethane plastic which comprises a first mixing chamber, said chamber having a plurality of inlets for the introduction of the components to said first mixing chamber, at least one of said inlets being an injection nozzle, a mechanical agitator disposed within said first mixing chamber and an outlet means, a second chamber spaced from said first mixing chamber and comprising a cylinder, a reciprocating piston disposed within said cylinder, an inlet means including at least one inlet to said cylinder, said inlet means connected by a conduit to the outlet means of said first mixing chamber, said inlet means opening into said cylinder below said piston when said piston is in the unactuated position, and an outlet means through which the material within said cylinder is discharged upon actuation of said piston, said outlet means including at least one conduit, an injection nozzle disposed for injecting a final component into said outlet means of said second chamber, said injection nozzle being connected to a reservoir for said final component.

3. An apparatus for mixing the components of a polyurethane plastic which comprises a first mixing chamber, said chamber having a plurality of inlets for the introduction of the components to said first mixing chamber, at least one of said inlets being an injection nozzle, means for recycling a component while said first mixing chamber is not operating, a mechanical agitator disposed within said first mixing chamber and an outlet means, a second chamber spaced from said first mixing chamber and comprising a cylinder, a piston tightly disposed within said cylinder, an inlet means including at least one inlet to said cylinder, said inlet means connected by a conduit to the outlet means of said first mixing chamber, said inlet means opening into said cylinder below said piston when said piston is in the unactuated position, and an outlet means through which the material within said cylinder is discharged upon actuation of said piston, said outlet means including at least one conduit, an injection nozzle disposed for injecting a final component into said outlet means of said second chamber, said injection nozzle being connected to a reservoir for said final component.

References Cited in the file of this patent

UNITED STATES PATENTS

| | | |
|---|---|---|
| 1,492,019 | Colony | Apr. 29, 1924 |
| 1,956,082 | Schwimmer | Apr. 24, 1934 |
| 2,203,980 | Burt | June 11, 1940 |
| 2,642,403 | Simon et al. | June 16, 1953 |
| 2,706,108 | Miner | Apr. 12, 1955 |
| 2,764,565 | Hoppe et al. | Sept. 25, 1956 |
| 2,788,337 | Preiswerk et al. | Apr. 9, 1957 |
| 2,885,268 | Breer et al. | May 5, 1959 |